United States Patent
Totsuka

(10) Patent No.: US 10,477,044 B2
(45) Date of Patent: Nov. 12, 2019

(54) IMAGE FORMING APPARATUS AND CONTROL METHOD ABLE TO DETECT A BOUND DOCUMENT DURING FEEDING

(71) Applicant: CANON KABUSHIKI KAISHA, Tokyo (JP)

(72) Inventor: Satoshi Totsuka, Tsukuba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/112,535

(22) Filed: Aug. 24, 2018

(65) Prior Publication Data

US 2019/0068811 A1 Feb. 28, 2019

(30) Foreign Application Priority Data

Aug. 31, 2017 (JP) ................................ 2017-167286

(51) Int. Cl.
*H04N 1/00* (2006.01)
(52) U.S. Cl.
CPC ..... *H04N 1/00474* (2013.01); *H04N 1/00037* (2013.01); *H04N 1/00082* (2013.01); *H04N 1/00472* (2013.01); *H04N 1/00604* (2013.01); *H04N 1/00639* (2013.01); *H04N 1/00811* (2013.01); *H04N 1/00466* (2013.01); *H04N 1/00488* (2013.01)
(58) Field of Classification Search
None
See application file for complete search history.

(56) References Cited

U.S. PATENT DOCUMENTS

| 2006/0082802 | A1* | 4/2006 | Furuya | G06F 3/1206 358/1.13 |
| 2012/0113487 | A1* | 5/2012 | Murakami | H04N 1/0062 358/498 |
| 2015/0373209 | A1* | 12/2015 | Aizono | H04N 1/0057 358/498 |
| 2016/0304305 | A1* | 10/2016 | Link | B65H 7/06 |
| 2017/0174457 | A1* | 6/2017 | Hirota | G03G 15/5062 |
| 2017/0355539 | A1* | 12/2017 | Yoshiwara | B65H 3/06 |
| 2017/0366698 | A1* | 12/2017 | Asai | H04N 1/00015 |

FOREIGN PATENT DOCUMENTS

JP 2001-285595 A 10/2001

* cited by examiner

*Primary Examiner* — Thomas D Lee
(74) *Attorney, Agent, or Firm* — Canon U.S.A. Inc., IP Division

(57) ABSTRACT

The present disclosure is directed to, during execution of a copy job for which a binding process setting is not set, detecting that a conveyed document is bound and allowing a user to perform the binding process setting before the copy job is executed again. A control method for controlling an image forming apparatus includes conveying a document placed on a document tray, reading an image on the conveyed document, printing the read image on a sheet, and binding the sheet on which the image is printed, and further includes detecting that the conveyed document is a bound document, according to the detection, suspending the conveyance of the document, and displaying a screen for prompting a user to start reading of the document of which the conveyance is suspended, wherein the screen is a screen capable of receiving a setting of a binding process to be executed.

19 Claims, 13 Drawing Sheets

FIG.6
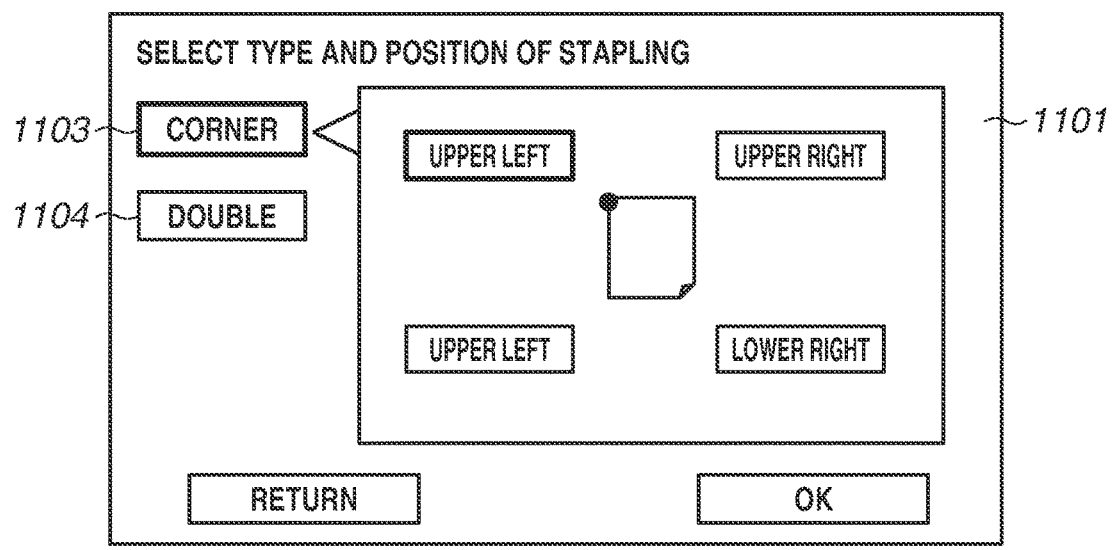
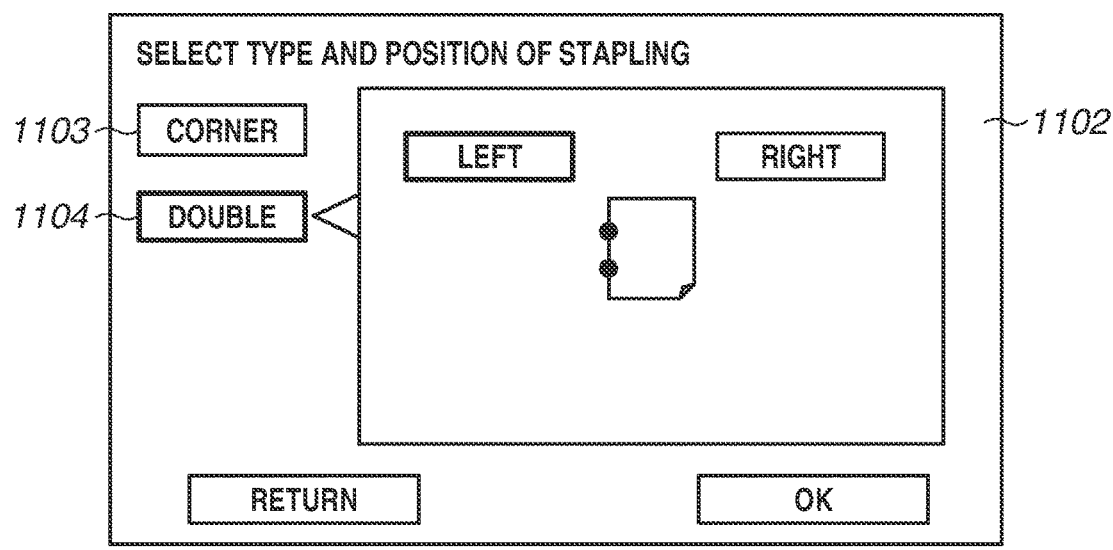

FIG.8

THERE IS POSSIBILITY THAT DOCUMENT IS BOUND. PLEASE REMOVE STAPLE.

PLEASE CHANGE DOCUMENT BACK TO FIRST DOCUMENT AND PRESS [START] KEY.

STAPLING IS NOT SET IN OUTPUT SETTINGS. DO YOU MAKE STAPLE SETTINGS?

1004 — ☐ STAPLE SETTINGS

1005 — [ STOP ]

COPY IS SUSPENDED NOW.

~1001

---

THERE IS POSSIBILITY THAT DOCUMENT IS BOUND. PLEASE REMOVE STAPLE.

PLEASE CHANGE DOCUMENT BACK TO FIRST DOCUMENT AND PRESS [START] KEY.

1005 — [ STOP ]

COPY IS SUSPENDED NOW.

~1002

---

PLEASE CHANGE DOCUMENT BACK TO FIRST DOCUMENT AND PRESS [START] KEY.

1005 — [ STOP ]

COPY IS SUSPENDED NOW.

~1003

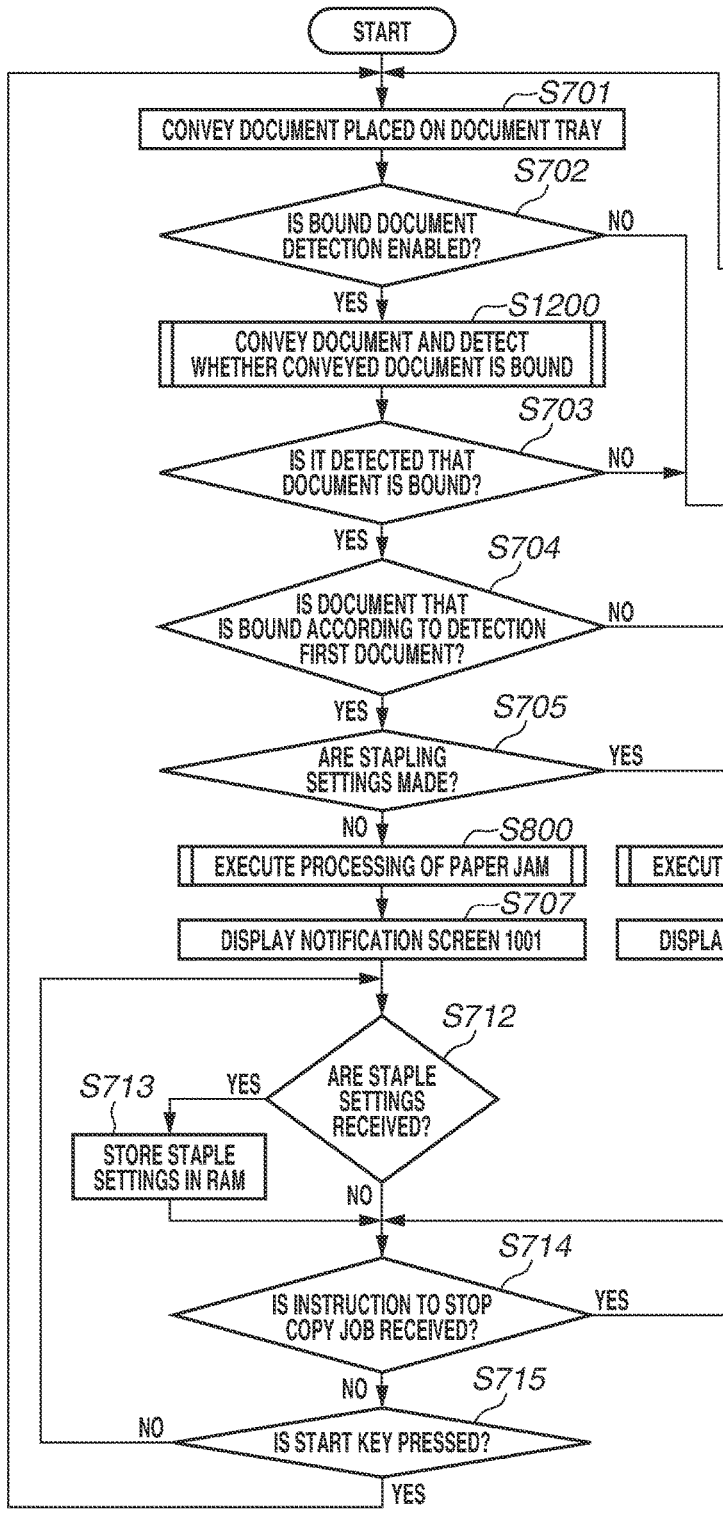

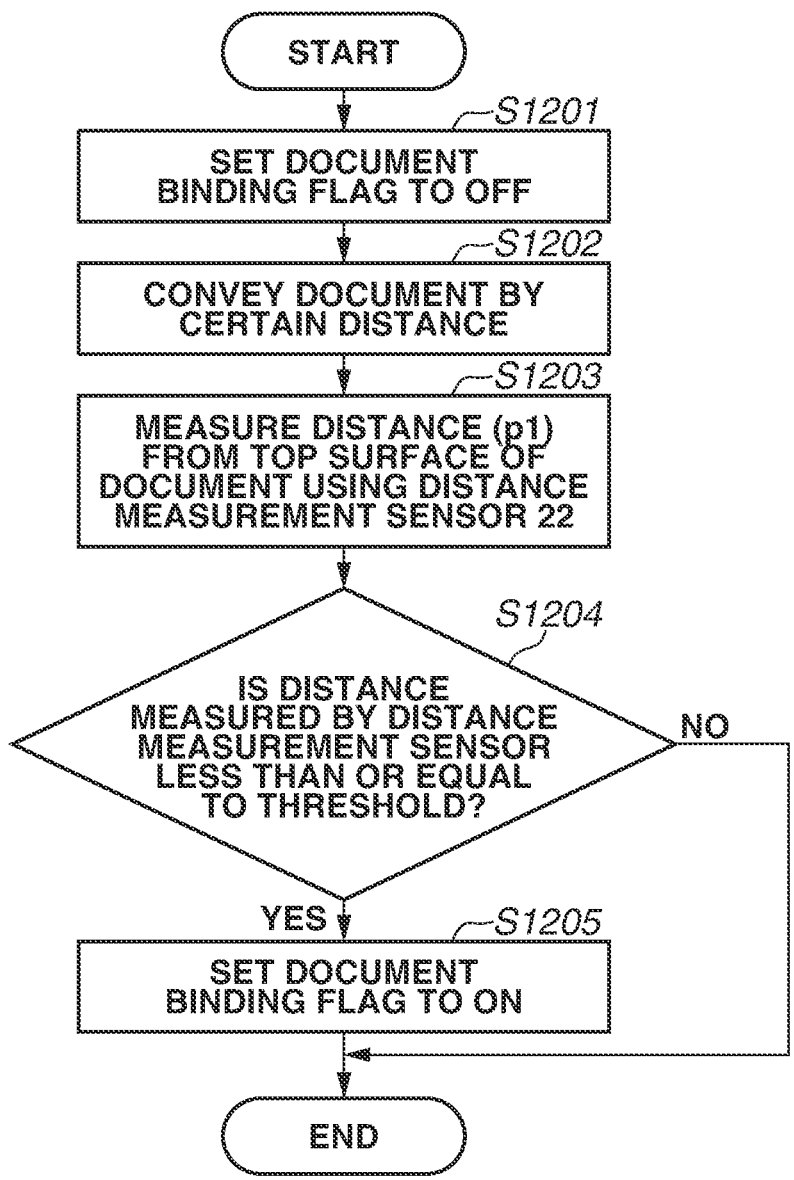

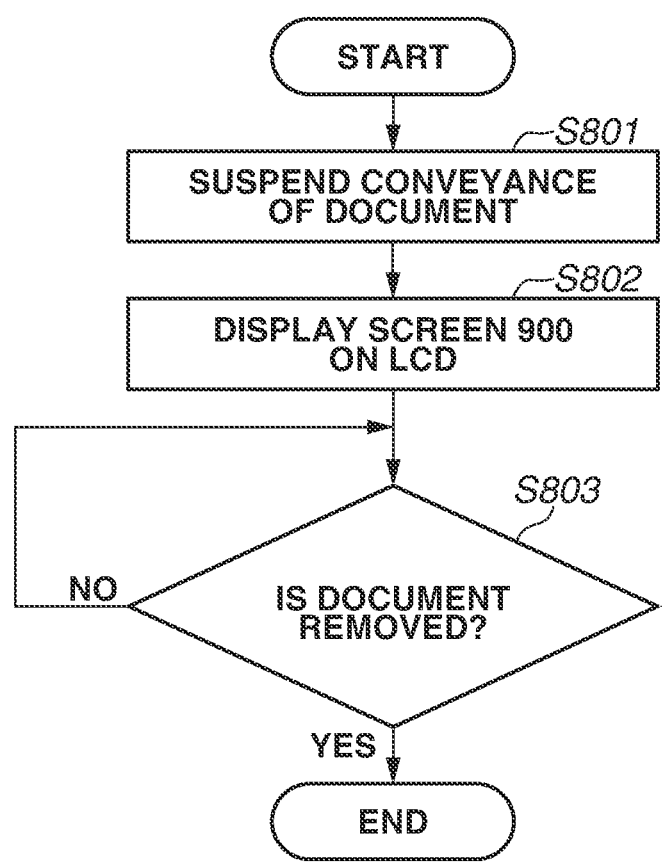

IMAGE FORMING APPARATUS AND CONTROL METHOD ABLE TO DETECT A BOUND DOCUMENT DURING FEEDING

BACKGROUND OF THE INVENTION

Field of the Invention

The present disclosure generally relates to an image forming apparatus for conveying a document, reading an image on the document, and printing the read image, and a control method for controlling the image forming apparatus.

Description of the Related Art

As an image forming apparatus for conveying documents one by one, reading an image on each document, and executing a copy job for printing the image, an image forming apparatus for binding, with a staple, sheets on which images are printed and outputting the sheets is known. According to a binding process setting made by a user, the image forming apparatus binds the sheets with a staple and outputs the sheets.

Meanwhile, to read bound documents and execute a copy job, the user needs to remove a staple from the bound documents, then set the documents on a document platen, and give an instruction to start the copy job.

In an image forming apparatus as described above, when a user gives an instruction to start a copy job in the state where documents bound with a staple are placed on a document tray, a technique for detecting that conveyed documents are bound documents, and suspending the conveyance of the documents is known. After the conveyance of the documents is suspended, the user takes the documents out of the image forming apparatus, removes the staple, places the documents on the document tray again, and gives an instruction to start a copy job. In this manner, the image forming apparatus executes the previous copy job again from the start.

The publication of Japanese Patent Application Laid-Open No. 2001-285595 discusses a sheet feeding apparatus that, using a sensor, detects jumping at a part of a document of a document bundle sent to the sheet feeding apparatus, thereby detecting that the document is a bound document.

If it is detected that documents conveyed by the image forming apparatus are bound documents, and the conveyance of the documents is suspended, this means that the documents are documents bound with a staple. In such a case, the user wishes to output a print product bound with a staple, similarly to the documents. However, in a case where the user starts a copy job without making stapling settings, and if the job is executed again as it is after the conveyance of the documents is suspended, sheets that are not bound with a staple are output.

SUMMARY OF THE INVENTION

According to an aspect of the present invention, an image forming apparatus includes a conveying unit configured to convey a document placed on a document tray, a reading unit configured to read an image on the document conveyed by the conveying unit, a printing unit configured to print on a sheet the image read by the reading unit, and a binding processing unit configured to bind the sheet on which the image is printed by the printing unit, and further includes a detection unit configured to detect that the document conveyed by the conveying unit is a bound document, a control unit configured to receive the detection by the detection unit and suspends the conveyance of the document by the conveying unit, and a display unit configured to display a screen for prompting a user to start reading of the document of which the conveyance is suspended by the control unit, wherein the screen is a screen capable of receiving a setting of a binding process for binding the sheet by the binding processing unit.

Further features of the present disclosure will become apparent from the following description of exemplary embodiments with reference to the attached drawings.

BRIEF DESCRIPTION OF THE DRAWINGS

FIG. 6 is a diagram illustrating examples of screens displayed on the LCD when stapling settings are made in the image forming apparatus according to the exemplary embodiment.

FIG. 8 is a diagram illustrating examples of screens displayed on the LCD when a bound document is conveyed by the ADF in the image forming apparatus according to the exemplary embodiment.

FIG. 11 is a flowchart illustrating processing for detecting that a conveyed document is a bound document in the image forming apparatus according to the exemplary embodiment.

FIG. 12 is a flowchart illustrating processing executed when a paper jam occurs in the image forming apparatus according to the exemplary embodiment.

DESCRIPTION OF THE EMBODIMENTS

Exemplary embodiments for carrying out the present disclosure will be described below with reference to the drawings.

Figure 1:
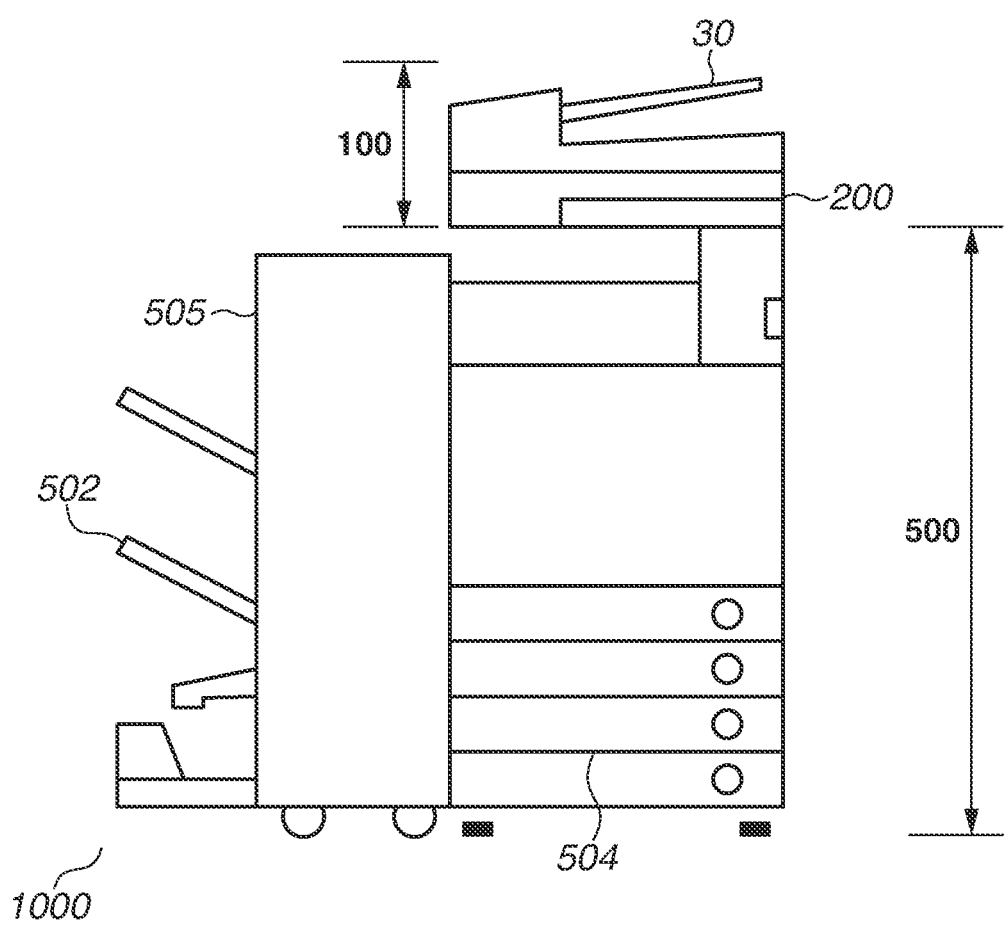
FIG. 1 is a diagram illustrating an example of an external appearance of an image forming apparatus according to an exemplary embodiment.

A first exemplary embodiment is described below. FIG. 1 is a diagram illustrating an example of the external appearance of an image forming apparatus 1000 according to the present exemplary embodiment.

An image reading unit 200 as a means of reading images causes an illumination lamp to emit light to perform exposure scanning on an image on a document, thereby obtaining reflected light. Then, the image reading unit 200 inputs the obtained reflected light to a linear image sensor (a charge-coupled device (CCD) sensor), thereby converting information of the image into an electric signal. The image reading unit 200 converts the electric signal into luminance signals of red (R), green (G), and blue (B) colors and outputs the luminance signals as image data to a controller unit 400.

Documents are set on a document tray 30 of an automatic document feeding unit (hereinafter, "ADF") 100. If a user gives an instruction through an operation unit 405 to start reading the documents, the controller unit 400 sends a reading instruction to read the documents to the image reading unit 200. The image reading unit 200 receives this instruction, conveys the documents one by one from the document tray 30 of the ADF 100, and executes a reading operation for reading each document. Further, the image reading unit 200 can also read an image on a document placed on document platen glass.

An image forming unit 500 is an image forming device for forming on a sheet an image based on image data received from the controller unit 400.

The image forming method of the image forming apparatus 1000 according to the present exemplary embodiment is an electrophotographic method using photosensitive drums and photosensitive belts. The image forming method, however, is not limited to the above method. For example, the image forming apparatus 1000 may be an image forming apparatus using an ink-jet method. Further, the image forming unit 500 includes, as a sheet feeding unit 504, a plurality of cassettes compatible with different sheet sizes or different sheet directions. A finisher unit 505 is a unit for performing post-processing such as binding, with a staple, sheets on which images are formed, and punching holes in the sheets. Further, a sheet discharge unit 502 is a place to which a sheet on which an image is formed is discharged from the image forming apparatus 1000 and the finisher unit 505.

Figure 2:
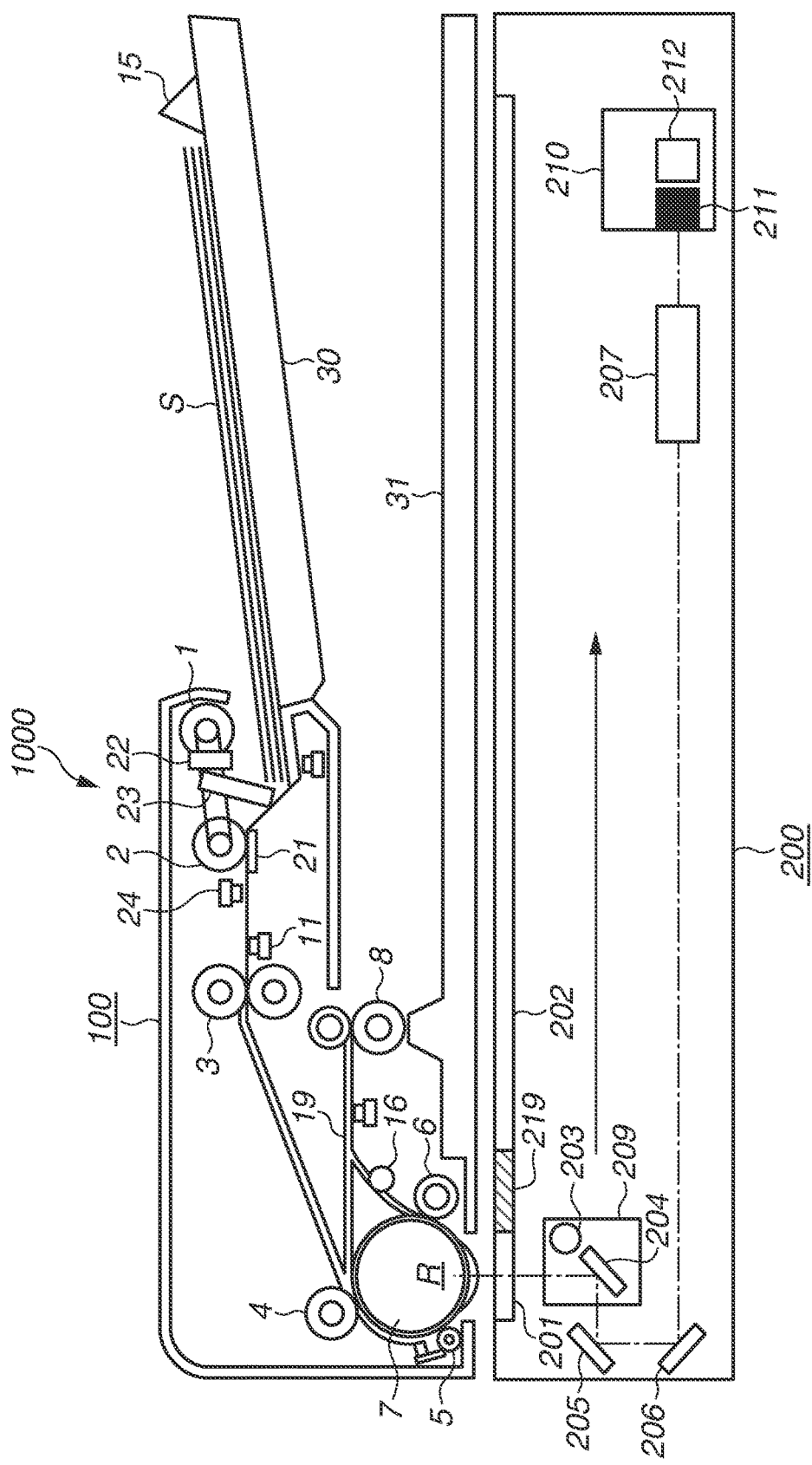
FIG. 2 is a diagram schematically illustrating an example of a configuration of an automatic document feeder (ADF) and an image reading unit according to the exemplary embodiment.

FIG. 2 is a diagram schematically illustrating examples of the configurations of the ADF 100 and the image reading unit 200 according to the present exemplary embodiment. (Example of Configuration of ADF 100)

With reference to FIG. 2, the operation of the ADF 100 is described. The ADF 100 illustrated in FIG. 2 includes the document tray 30, on which a document bundle S including one or more documents is stacked, a separation pad 21, which prevents the document bundle S from protruding from the document tray 30 and advancing downstream before the conveyance of the documents is started, and a sheet feeding roller 1, which conveys the documents. Further, the ADF 100 includes a document detection sensor 23, which detects that a document is placed on the document tray 30, a distance measurement sensor 22, which measures the distance from the top surface of the document bundle S, and a separation sensor 24, which detects that a document passes through a separation roller 2. The sheet feeding roller 1 falls on the document surface of the document bundle S placed on the document tray 30 and rotates to convey the documents. Consequently, a document on the top surface of the document bundle S is fed to the ADF 100. The documents conveyed by the sheet feeding roller 1 are separated one by one by the actions of the separation roller 2 and the separation pad 21. This separation is achieved by a known retard separation technique. By the actions of the separation roller 2 and the separation pad 21, the image forming apparatus 1000 can convey only the document on the top surface of the document bundle S including the plurality of documents.

At this time, even if a certain time (t1) elapses from the start of the conveyance of the document, and if the separation sensor 24 does not detect the document, the ADF 100 determines that there is no document to be conveyed. Then, the ADF 100 stops the driving of the sheet feeding roller 1. The certain time (t1) until the driving of the roller is stopped is the time expected according to the conveying speed of a sheet and is the time obtained by adding a sufficient time to the time required by the sheet to reach the separation sensor 24.

The document separated by the separation roller 2 and the separation pad 21 is conveyed to a registration roller 4 by a conveying roller pair 3 and is hit against the registration roller 4. Downstream of the registration roller 4, a sheet feeding path for conveying in the direction of skimming-through glass 201 the document having passed through the registration roller 4 is placed.

The document sent to the sheet feeding path is sent onto a platen by a large roller 7 and a conveying roller 5. The document conveyed by the large roller 7 passes through a conveying roller 6, moves between a roller 16 and movement glass, and is discharged to a document discharge tray 31 through a sheet discharge flapper and sheet discharge rollers 8.

In the state where the document is inserted between the sheet discharge rollers 8, the ADF 100 in FIG. 2 rotates the sheet discharge rollers 8 backward to switch the sheet discharge flapper. Consequently, the ADF 100 moves the document to a reverse path 19. Then, the ADF 100 hits the moved document against the registration roller 4 from the reverse path 19. Then, the document is moved to the skimming-through glass 201 again by the conveying roller 5 and the large roller 7, and the ADF 100 reads the back surface of the document.

Further, in the document tray 30, a guide regulation plate 15 is provided, which can slide in a sub-scanning direction of the documents placed on the document tray 30, and a document width detection sensor (not illustrated) is also provided, which detects the document width in conjunction with the guide regulation plate 15. By the combination of the document width detection sensor and a pre-registration sensor 11, the ADF 100 can distinguish the document size of the documents stacked on the document tray 30. Further, using a document length detection sensor (not illustrated) provided in a conveying path, the ADF 100 detects the document length based on the conveyance distance between the detection of the front end of a document that is being conveyed and the detection of the rear end of the document. Further, also by the combination of the detected document length and the document width detection sensor, the ADF 100 can distinguish the document size.

Further, the distance measurement sensor 22 is a sensor that is installed above the document bundle S stacked on the document tray 30 and measures the distance from the distance measurement sensor 22 to the top surface of the document bundle S. The distance measurement sensor 22 may be any sensor capable of measuring the distance to the top surface of the document bundle S. In the present exemplary embodiment, the distance measurement sensor 22 emits light to the document bundle S, and according to the time until the reflected light from the document bundle S is measured, measures the distance to the top surface of the document bundle S. After a predetermined time (t2) elapses from the start of the conveyance of the document, the ADF 100 causes the distance measurement sensor 22 to measure the distance from the document. Then, if the distance measured by the distance measurement sensor 22 is shorter than a predetermined distance, the ADF 100 detects that the document bundle S is bound. At this time, a setting is made such that t1>t2, whereby, before a jam occurs, it is possible to detect that the document bundle S is bound.

(Example of Configuration of Image Reading Unit 200)

The image reading unit 200 moves an optical scanner unit 209 in a sub-scanning direction indicated by an arrow in FIG. 2 and optically reads an image on a document placed on document platen glass 202. Further, when the ADF 100 reads documents, the image reading unit 200 moves the optical scanner unit 209 to a reading center position R of the large roller 7 of the ADF 100. Then, using the optical scanner unit 209, the image reading unit 200 reads images on the documents conveyed one by one to the skimming-through glass 201.

Each document on the ADF 100 or the document on the document platen glass 202 is read by the following optical system. This optical system includes the skimming-through glass 201, the document platen glass 202, the optical scanner unit 209, which includes a lamp 203 and a mirror 204, mirrors 205 and 206, a lens 207, and a CCD sensor unit 210. Further, a white plate 219 is a white plate for creating reference data for a white level by shading.

In the present exemplary embodiment, the CCD sensor unit 210 includes a color image reading (RGB) CCD (3-line sensor unit) 212 and a monochrome image reading CCD (1-line sensor unit) 211.

Figure 3:
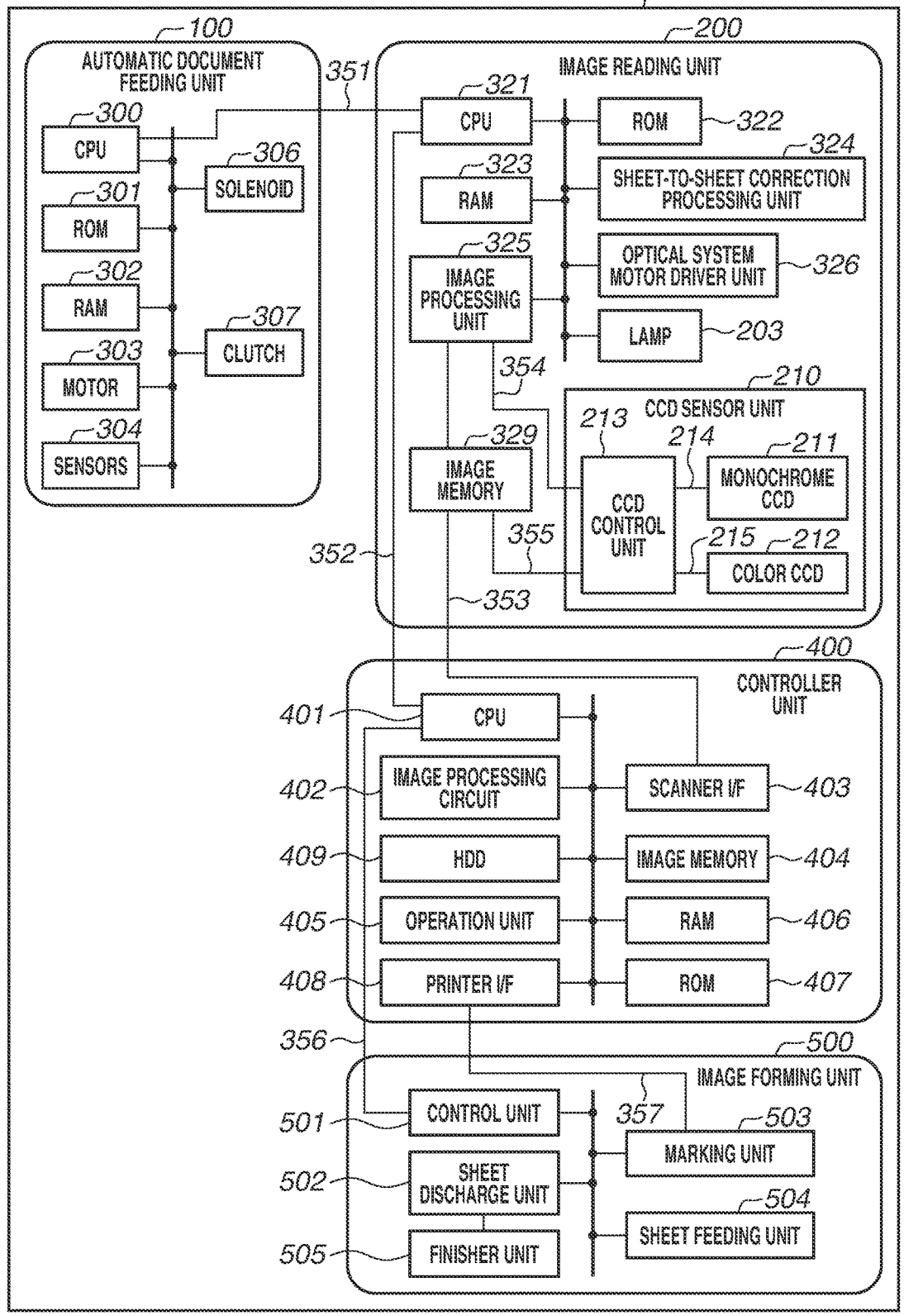
FIG. 3 is a block diagram illustrating a configuration of the image forming apparatus according to the exemplary embodiment.

FIG. 3 is a block diagram illustrating the configuration of the image forming apparatus 1000 according to the present exemplary embodiment.

(Control Block of ADF 100)

The control block of the ADF 100 includes a control unit (hereinafter, "CPU") 300, which is a central processing unit, a read-only memory (hereinafter, "ROM") 301, a random-access memory (hereinafter, "RAM") 302, an output port, and an input port. The ROM 301 stores a control program and a fixed parameter. The RAM 302 stores input data and work data.

The output port is connected to a motor 303, a solenoid 306, and a clutch 307, which drive various conveying rollers. The input port is connected to each of various sensors 304.

The CPU 300 controls the conveyance of a sheet by the ADF 100 according to a control program stored in the ROM 301 connected to the CPU 300 via a bus line. The CPU 300 performs serial communication with a central processing unit (CPU) 321 of the image reading unit 200 via a control communication line 351, and transmits and receives control data to and from the image reading unit 200. Further, the CPU 300 notifies the image reading unit 200 of a signal, which is a reference for the front end of document image data, through the control communication line 351.

Further, according to control data from the CPU 321 of the image reading unit 200, the CPU 300 notifies the image reading unit 200 of the values of the various sensors 304. The values of the various sensors 304 include distance data measured by the distance measurement sensor 22.

(Control Block of Image Reading Unit 200)

In the control block of the image reading unit 200, the CPU 321 controls the entirety of the image reading unit 200. The CPU 321 is connected to a ROM 322, which stores a program, and a RAM 323, which provides a work area. The RAM 323 is a work area including an area where non-volatile storage is performed.

An optical system motor driver unit 326 is a driver circuit for driving an optical system driving motor. The image reading unit 200 is connected to the lamp 203 and the CCD sensor unit 210 (the monochrome image reading CCD 211 for a surface image and the color image reading CCD 212 for a surface image). The CPU 321 controls the optical system motor driver unit 326 and controls the CCD sensor unit 210 via an image processing unit 325, thereby executing an image reading process.

To the CPU 300 for controlling the conveyance of a sheet by the ADF 100, the CPU 321 transmits via the control communication line 351 a command regarding the control of the conveyance of a sheet. The CPU 300 having received the command acquires the values of the various sensors 304 placed on the conveying path and drives the motor 303, the solenoid 306, and the clutch 307 for conveyance, which are loads, thereby achieving the conveyance of a sheet. As described above, the CPU 321 controls the conveyance of a sheet by the ADF 100 and controls the reading of an image by the image reading unit 200. A sheet-to-sheet correction processing unit 324 is a control unit for controlling the distances between documents conveyed by the ADF 100. Depending on the type of documents placed on the document tray 30, the distances between the documents may not be uniform when the documents are conveyed. In response, the sheet-to-sheet correction processing unit 324 performs control so that the distances between documents conveyed by the ADF 100 are constant.

An image signal based on which an image is formed on the CCD sensor unit 210 (either of the color image reading (RGB) CCD 212 and the monochrome image reading CCD 211) by the lens 207 is converted into a digital signal. The image data converted into the digital signal is subjected to various types of image processing, such as shading, for detecting and correcting a line image on the image data by the image processing unit 325 and written to an image memory 329.

The data written in the image memory 329 is sequentially transmitted to the controller unit 400 through a controller interface image data information communication line (controller interface control communication line) 353, which includes an image transfer clock signal line. Further, the CPU 321 adjusts the timing of an image front signal as a reference for the front end of document image data and notifies the controller unit 400 of the image front signal through a controller interface control communication line 352. The CPU 321 of the image reading unit 200 also similarly adjusts the timing of an image front signal notified through the communication line from the ADF 100 and notifies the controller unit 400 of the image front signal through the controller interface control communication line 352.

The CPU 321 controls the image processing unit 325, which is connected on a control bus line. Further, the CPU 321 transmits a control signal to the CCD sensor unit 210 through a control communication line 354 via the image processing unit 325, thereby controlling the CCD sensor unit 210. The CCD sensor unit 210 scans an image on a document and reads the image on the document using the color image reading CCD 212 or the monochrome image reading CCD 211. Then, an analog image signal for each line of the read image is output to a CCD control unit 213 through an image data communication line 214 or 215, which includes an image transfer clock signal line.

The CCD control unit 213 converts the analog signal into digital image data. The converted digital image data is sent to the image memory 329 from an image data information communication line 355, which includes an image transfer clock signal line. The digital image data sent to the image memory 329 is transmitted to the controller unit 400 through the image data information communication line 353.

The CPU 321 performs serial communication with a CPU 401 of the controller unit 400 via the image data information communication line 352, and transmits and receives control data to and from the controller unit 400. In the present exemplary embodiment, according to receipt of a notification that the shape of a document is abnormal, the CPU 401 determines that a document that is being conveyed is a document bound with a staple.

(Control Block of Controller Unit 400)

The controller unit 400 for image processing is a device for controlling the entirety of the image forming apparatus 1000, which includes the ADF 100, the image reading unit 200, and the image forming unit 500. The controller unit 400 includes the CPU 401, an image processing circuit 402, a scanner interface (IF) 403, an image memory 404, the operation unit 405, a RAM 406, which provides a work area, a ROM 407, which stores a program, a printer IF 408, and a hard disk drive (HDD) 409. The RAM 406 is a work area also including an area where non-volatile storage is performed. In the present exemplary embodiment, a program is stored in the ROM 407. Alternatively, the configuration may be such that a program is loaded from the HDD 409 into the RAM 406 and executed by the CPU 401.

Image data transmitted to the controller unit 400 through the image data information communication line 353 is stored in the image memory 404 through the scanner IF 403.

The image processing circuit 402 converts an image on the image memory 404 and stores the converted image in the image memory 404 again. The image conversion process performed by the image processing circuit 402 includes a rotation process for rotating an image in the unit of 32 pixels×32 pixels, for example, at a specified angle, and a resolution conversion process for converting the resolution of an image. The image processing circuit 402 further executes a magnification process for changing the magnification of an image, a color space conversion process for performing matrix calculation on an image subjected to multi-valued input and converting a YUV image into a Lab image based on a lookup table (LUT).

The operation unit 405 includes a liquid crystal display (LCD), a touch panel input device attached to the LCD, and a plurality of hardware keys. A signal input using the touch panel or the hardware keys is transmitted to the CPU 401. The LCD displays functions in operations on the image forming apparatus 1000 or image data.

The CPU 401 receives an image front signal from the image forming unit 500 through a controller interface control communication line 356. Based on the received image front signal, the CPU 401 sequentially transmits data written in the image memory 404 to the image forming unit 500.

In the present exemplary embodiment, the plurality of CPUs described above cooperate to execute the following processing. Alternatively, the configuration may be such that a single CPU executes the following processing. Yet alternatively, a computer including the plurality of CPUs or the single CPU may execute the following processing.

(Control Block of Image Forming Unit 500)

The image forming unit 500 conveys a sheet, prints image data as a visible image on the sheet, and discharges the sheet to outside the apparatus. The image forming unit 500 includes a control unit 501, which controls the image forming unit 500, the sheet feeding unit 504, which includes a plurality of types of recording sheet cassettes, and a marking unit 503, which has the function of transferring image data onto a recording sheet and fixing the image data thereon. The image forming unit 500 further includes the sheet discharge unit 502, which has the function of outputting a sheet on which an image is formed to outside the image forming unit 500, and the finisher unit 505, which performs post-processing such as a punching process and a sorting process.

In a case where the marking unit 503 is prepared for image formation, the control unit 501 transmits an image front signal as a reference for the front end of document image data to the controller unit 400 through the controller interface control communication line 356.

Then, the marking unit 503 transfers an image generated from image data sent through a controller interface image communication line 357 onto a sheet and fixes the image thereon.

Figure 4:
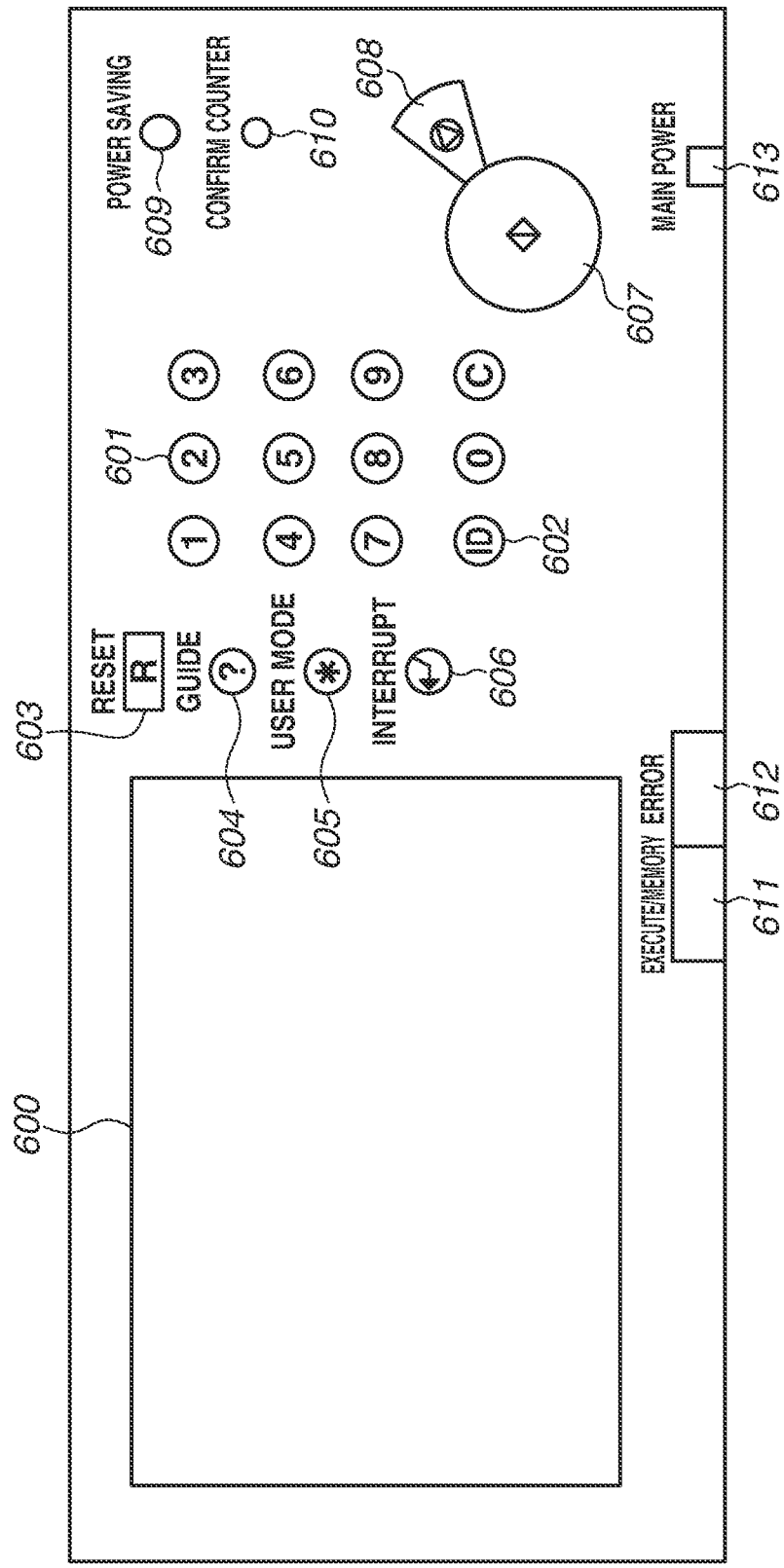
FIG. 4 is a diagram illustrating an external appearance of an operation unit of the image forming apparatus according to the exemplary embodiment.

With reference to FIG. 4, the operation unit 405 of the image forming apparatus 1000 is described below. An LCD 600 allows the user to select a function to be used and displays the state of the image forming apparatus 1000. A numeric keypad 601 is used to input numerical values from 0 to 9. An "ID" key 602 is a key used to input a department number and a password mode in a case where the apparatus is managed on a departmental basis.

A "reset" key 603 is used to reset the setting values of a set job. A "guide" key 604 is used to display a screen for explaining each mode. An "interrupt" key 606 is a key for the user to instruct the image forming apparatus 1000 to perform interrupt copying.

A "start" key 607 is used to start copying or scanning. A "stop" key 608 is used to stop a job that is being executed.

A "user mode" key 605 is a key for displaying a user mode screen on the LCD touch panel. The user mode screen is a screen for the user to make various settings regarding the image forming apparatus 1000.

A "power saving" key 609 is a key for the user to give an instruction to switch the state of the image forming apparatus 1000 from a normal state to a power saving state. If the user presses the "power saving" key 609, the state of the image forming apparatus 1000 transitions from the normal state to the power saving state. Then, if the user presses the "power saving" key 609 again, the image forming apparatus 1000 returns from the power saving state.

A "confirm counter" key 610 is a key for displaying on the LCD 600 a count screen indicating the total number of copies that the user has used so far.

A light-emitting diode (LED) 611 is an LED indicating that a job is being executed, or an image is being accumulated in an image memory. An LED 612 is an error LED indicating that the apparatus is in an error state such as a jam or the opening of a door. Further, an LED 613 is a power LED indicating that a main switch of the apparatus is on.

With reference to FIGS. 5 to 8, the operation of the image forming apparatus 1000 according to the present exemplary embodiment is described.

Figure 5:
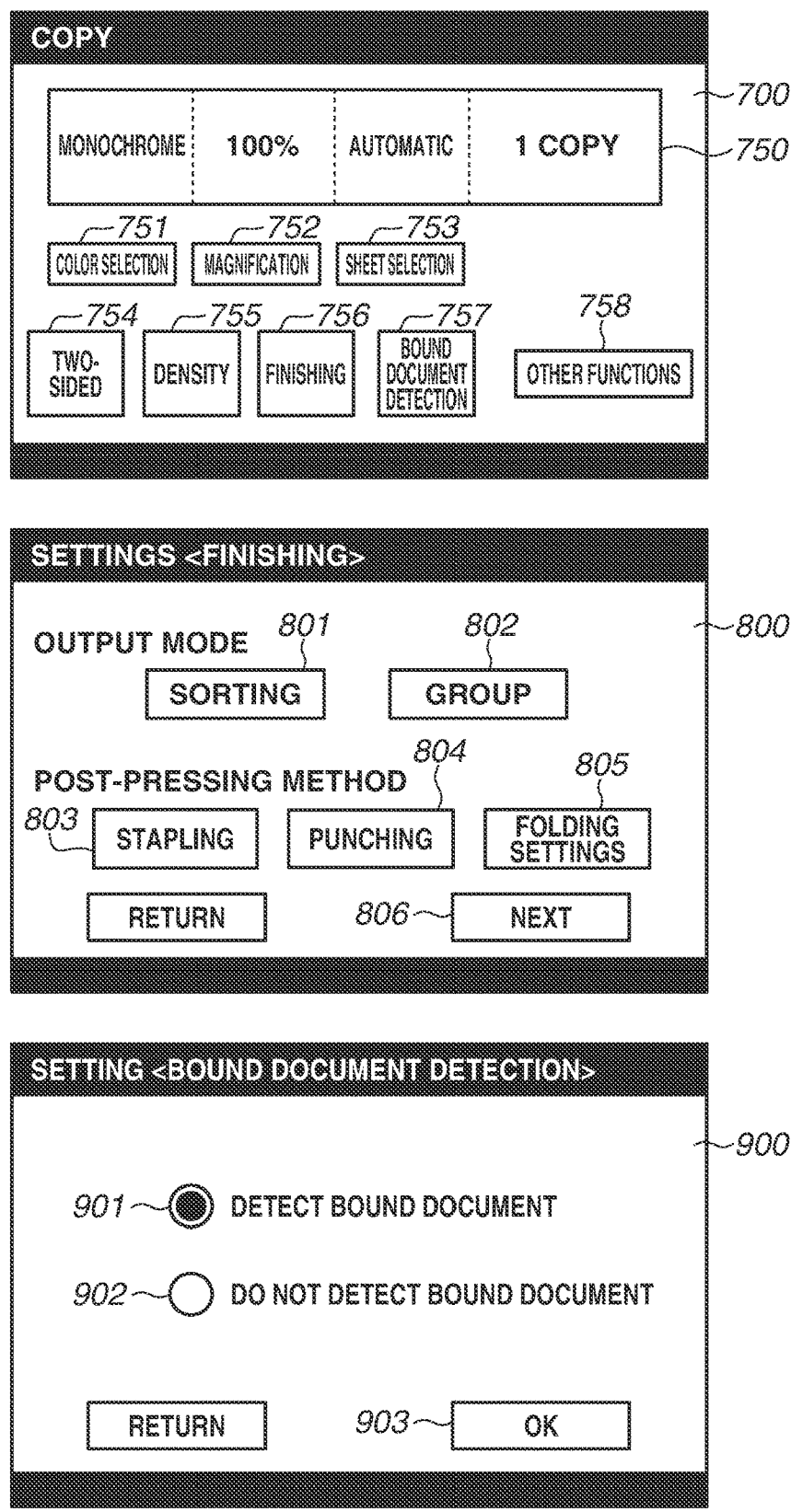
FIG. 5 is a diagram illustrating examples of screens displayed on a liquid crystal display (LCD) when a copy job is set in the image forming apparatus according to the exemplary embodiment.

FIG. 5 illustrates setting screens for setting a copy job displayed on the LCD 600.

A copy screen 700 is a screen for setting "color selection" 751, "magnification" 752, and "sheet selection" 753 as basic settings of the copy job. The user performs a tap operation on an item that the user wishes to set. Then, the user sets the setting value of the copy job. Then, the setting value set by the user is displayed in an area 750. "Other functions" 758 is a button for setting setting items that cannot be set on the copy screen 700. The other setting items are, for example, page printing settings for making settings regarding page numbers to be printed when printing is performed, page aggregate settings for printing a plurality of pages on a single sheet, and book binding settings.

A key for setting a setting item frequently used by the user among the other setting items can be displayed as a shortcut key on the copy screen 700. "Two-sided" 754, "density" 755, "finishing" 756, and "bound document detection" 757 are items set as shortcut keys among the other setting items. The "two-sided" 754 is a button for setting which of two-sided printing and one-sided printing is to be performed. The "density" 755 is a button for setting the density of printing. The "finishing" 756 is a button for setting a method for discharging a sheet on which an image is printed, and post-processing to be performed on the sheet. The "bound document detection" 757 is a button for setting whether to detect that a document placed on the document tray 30 of the ADF 100 is a bound document.

A bound document detection screen 900 is a screen displayed on the LCD 600 when the user performs a tap operation on the "bound document detection" 757 on the copy screen 700. A button 901 is a button for enabling the mode of detecting whether a document conveyed by the ADF 100 in the copy job is a bound document. On the other hand, a button 902 is a button for disabling the mode of detecting whether a document conveyed by the ADF 100 is a bound document. The user can select either one of the buttons 901 and 902. The user performs a tap operation on an "OK" button 903, thereby storing in the RAM 406 the enabled state or the disabled state of the mode selected using the button 901 or 902. In the default setting of bound document detection, the mode of detecting a bound document is enabled. If the user does not change this setting to a setting for disabling the mode of detecting a bound document, the ADF 100 always conveys a document in the state where the mode of detecting a bound document is enabled. If the bound document detection mode is enabled, and when the conveyance of a bound document is detected, the ADF 100 suspends the conveyance of the document.

In the present exemplary embodiment, it is assumed that bound document detection is set to enabled.

A finishing screen 800 in FIG. 5 is a diagram illustrating an example of a setting screen for setting post-processing displayed on the LCD 600 when the user performs a tap operation on the "finishing" 756 on the copy screen 700.

"Sorting" 801 and "group" 802 are buttons for, in a case where a plurality of copies is to be printed in the copy job, setting which of sorting output for outputting sheets in page order according to the number of copies, and group output for outputting as many sheets as the number of copies with respect to each page is to be performed. "Stapling" 803 is a button for setting the method for binding, with a staple, sheets on which images are printed, and the binding position of the sheets. "Punching" 804 is a button for setting the number of holes to be punched in sheets, and the positions of the holes. "Folding settings" 805 is a button for setting the folding position of a sheet on which an image is printed, and the method for folding the sheet. The user performs a tap operation on any of the "stapling" 803, the "punching" 804, and the "folding settings" 805 and then performs a tap operation on "next" 806, and thereby can set the details of post-processing.

FIG. 6 is examples of screens displayed on the LCD 600 when the user performs a tap operation on the "stapling" 803 on the finishing screen 800 and then performs a tap operation on the "next" 806.

A "corner settings" screen 1101 is a setting screen for setting any one of the four corners of a sheet to be bound with a staple. The user performs a tap operation on "corner" 1103 and then performs a tap operation on a position to be bound with a staple among "upper left", "upper right", "lower left", and "lower right", thereby selecting the staple position. Then, the user performs a tap operation on "OK", whereby the settings of stapling are completed.

A "double settings" screen 1102 is a setting screen for setting two positions on either of the left and right sides of a sheet are to be bound with staples. The user performs a tap operation on "double" 1104, then selects either one of "left" and "right", and performs a tap operation on "OK", whereby the settings of stapling are completed.

If the user selects the "punching" 804 or the "folding settings" 805, then similarly to the "stapling" 803, the user performs a tap operation on the "next" 806, whereby a screen for making detailed settings (not illustrated) is displayed on the LCD 600.

By the above method, before the copy job is started, the user can make a binding process setting for binding, with a staple, sheets on which images are printed.

Suppose that after the user finishes making settings regarding the copy job, the user presses the "start" key 607 in the state where a document bound with a staple is placed on the document tray 30 of the ADF 100.

The ADF 100 starts conveying the document placed on the document tray 30. Then, the distance measurement sensor 22 measures the distance between the document and the distance measurement sensor 22. In a case where a bound document is conveyed, the shape of the document is distorted, and the document comes close to the distance measurement sensor 22. If that the distance measured by the distance measurement sensor 22 becomes less than or equal to a predetermined threshold, the ADF 100 determines that the document that is being conveyed is a bound document. Then, the ADF 100 suspends the conveyance of the document.

Figure 7:
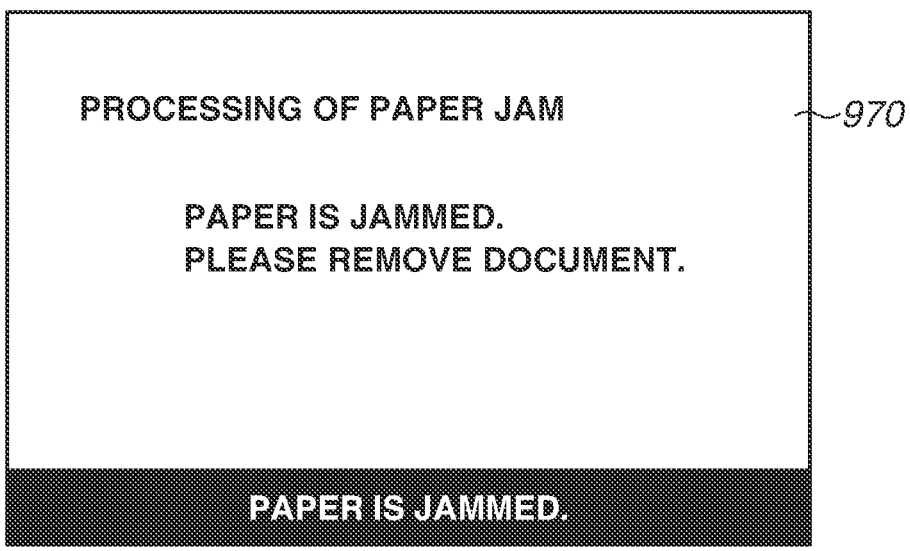
FIG. 7 is a diagram illustrating an example of a screen displayed on the LCD when a paper jam occurs in the image forming apparatus according to the exemplary embodiment.

FIG. 7 is a screen 907 displayed on the LCD 600 when the conveyance of the document is suspended. The screen 907 is a screen displayed in a case where the conveyance of a document cannot normally continue, and is a screen displayed on the LCD 600 according to the conveyance of a bound document or the occurrence of a paper jam. The user having viewed the screen 907 removes the document from the ADF 100.

Suppose that the copy job that is being executed is a copy job for which stapling settings are not made. If detecting that the document is removed, the ADF 100 displays on the LCD 600 a notification screen 1001 illustrated in FIG. 8. The notification screen 1001 is a screen for notifying the user that a document of which the conveyance is suspended is a bound document, and urging the user to remove a staple of the document. Further, the notification screen 1001 also serves as a screen for prompting the user to change the document back to the state where the reading is started, place the document on the document tray 30 again, and start the reading of the document.

If the user places the document on the document tray 30 again and then presses the "start" key 607, the image forming apparatus 1000 executes a job based on settings similar to those of the previous copy job.

On the other hand, "stop" 1005 is a button for stopping the copy job. If the user performs a tap operation on the "stop" 1005, the copy screen 700 indicating the default setting values is displayed on the LCD 600. In the present exemplary embodiment, according to a tap operation having been performed on the "stop" 1005, the copy screen 700 reflecting the setting values of the default settings is displayed on the LCD 600. Alternatively, when a tap operation is performed on the "stop" 1005, the copy screen 700 reflecting the setting values of the copy job that is being executed may be displayed on the LCD 600. At this time, through the user mode screen, the user can set which of the screen reflecting the setting values of the default settings, and the screen reflecting the setting values of the copy job that is being executed is to be displayed.

"Stapling settings" 1004 is a button for the user to make stapling settings. If the user performs a tap operation on the "stapling settings" 1004, the "corner settings" screen 1101 or the "double settings" screen 1102 described in FIG. 6 is displayed on the LCD 600. If the user performs a tap operation on "OK" on the "corner settings" screen 1101 or the "double settings" screen 1102, specified stapling settings are stored in the RAM 406. Then, the notification screen 1001 is displayed again on the LCD 600.

As described above, in a case where the user sets a bound document on the document tray 30 and starts a copy job, the image forming apparatus 1000 detects that the document is bound. Then, the image forming apparatus 1000 displays the notification screen 1001 on the LCD 600. In this manner, the conveyance of the document is suspended, and before the copy job is executed again, the user can perform a tap operation on the "stapling settings" 1004 and make a binding process setting.

In a case where the ADF 100 conveys a bound document in the state where stapling settings are already made, the conveyance of the bound document is suspended, and then, a notification screen 1002 in FIG. 8 is displayed on the LCD 600. Since stapling settings are already made for the copy job of which the execution is suspended, it is not necessary to make stapling settings again. In response, unlike the notification screen 1001, the notification screen 1002 does not display the "stapling settings" 1004.

Further, in a case where a document conveyed by the ADF 100 is not a bound document, a jam of the document may be detected during the conveyance of the document. At this time, a notification screen 1003 in FIG. 8 is displayed on the LCD 600. Since the document that is being conveyed is not a bound document, a message indicating the removal of a staple and the "stapling settings" 1004 are not displayed.

No matter which of the notification screens 1001 to 1003 is displayed on the LCD 600, if the user presses the "start" key 607, the ADF 100 starts reading the document, and the image forming apparatus 1000 executes the copy job. At this time, the image forming apparatus 1000 does not read an image on a page on which a document is already read and the generation of image data is completed. Then, the image forming apparatus 1000 only conveys this document.

With reference to FIGS. 9 to 12, a description is given of processing performed when the image forming apparatus 1000 reads a document and executes a copy job.

Figure 9:
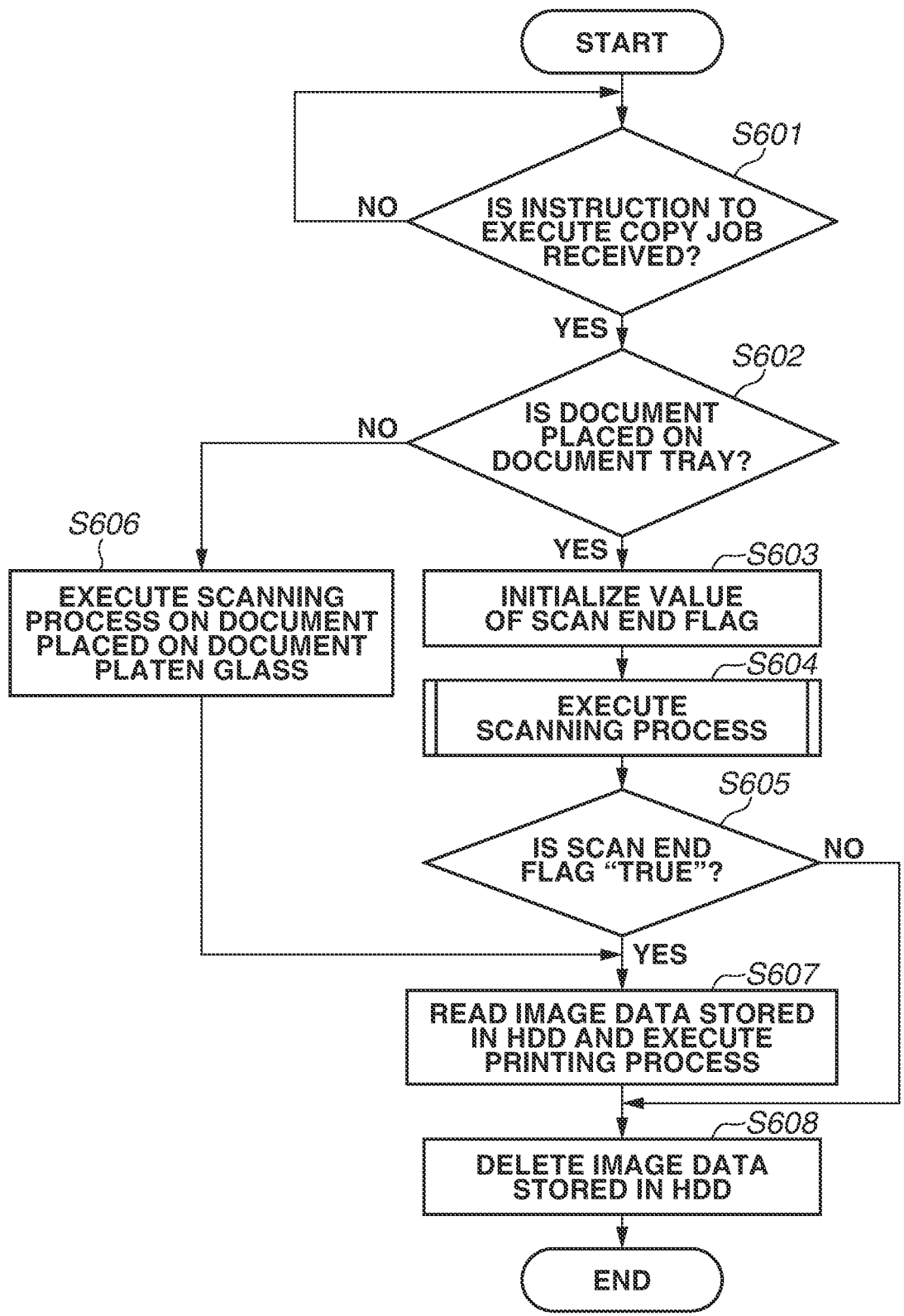
FIG. 9 is a flowchart illustrating processing executed when a copy job is executed in the image forming apparatus according to the exemplary embodiment.
Figure 10B:
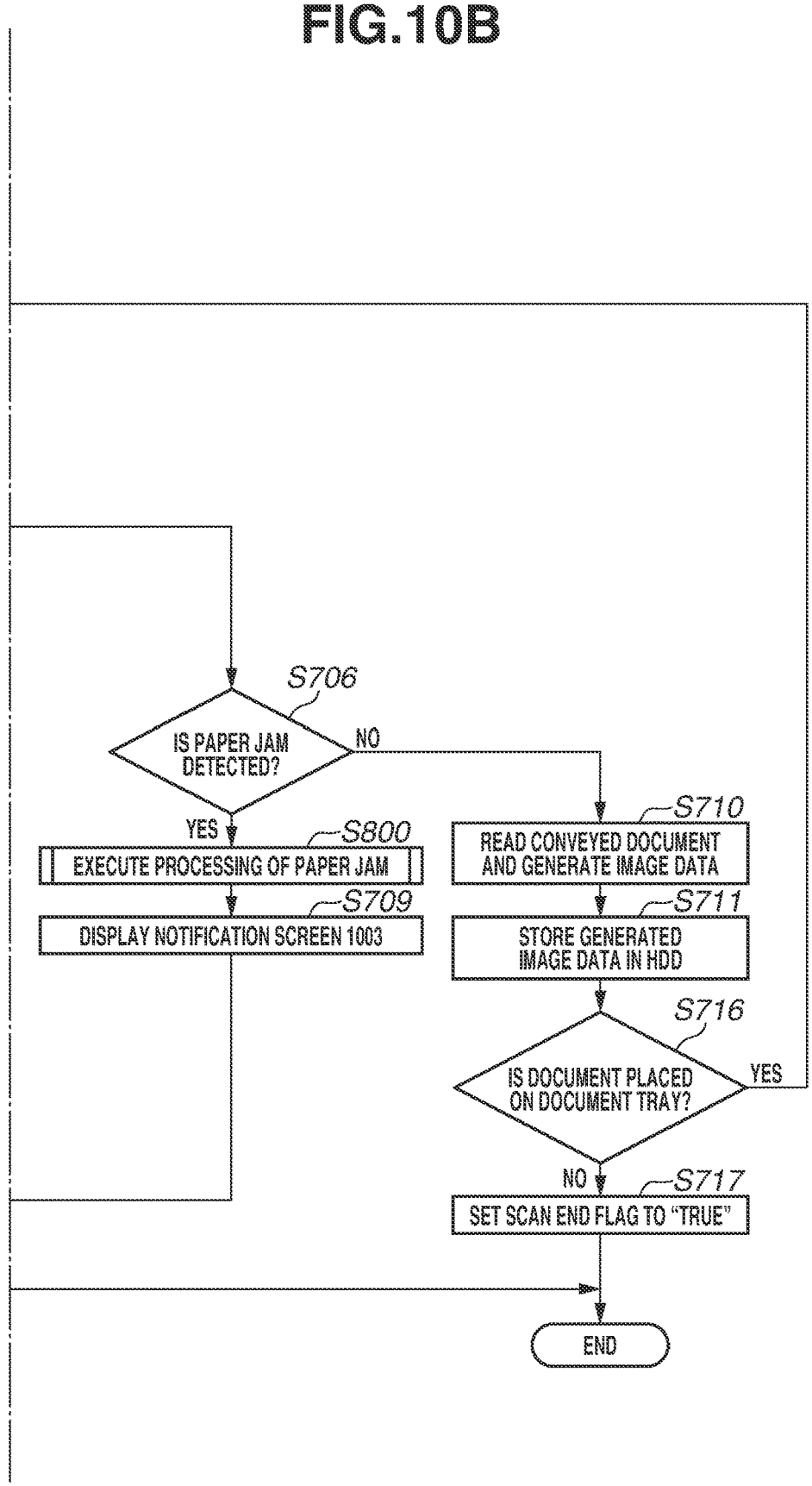
FIG. 10, consisting of FIGS. 10A and 10B, is a flowchart illustrating processing executed when a scanning process is executed in the image forming apparatus according to the exemplary embodiment.

The processes of steps S601, S603, S605, S607, and S608 in FIG. 9 are achieved by the CPU 401 executing a program stored in the ROM 407. Step S602 in FIG. 9 is achieved by the CPU 300 executing a program stored in the ROM 301. Further, step S606 in FIG. 9 is achieved by the CPU 321 executing a program stored in the ROM 322. The process described in step S604 is executed by the cooperation of the CPUs 300, 321, and 401. The process described in step S604 will be described below with reference to FIGS. 10A and 10B (hereinafter collectively referred to as FIG. 10).

In step S601, the CPU 401 determines whether the CPU 401 receives an instruction to execute a copy job. In step S601, the CPU 401 determines whether the "start" key 607 is pressed.

If the CPU 401 receives an instruction to execute a copy job (YES in step S601), the processing proceeds to step S602. If, on the other hand, the CPU 401 does not receive an instruction to execute a copy job (NO in step S601), the CPU 401 repeats the process of step S601 until the CPU 401 receives an instruction to execute a copy job.

After the CPU 401 receives the instruction to execute a copy job, then in step S602, the CPU 300 determines whether a document is placed on the document tray 30. The CPU 300 receives a detection signal from the document detection sensor 23, thereby determining whether a document is placed on the document tray 30. If it is determined that a document is placed on the document tray 30 (YES in step S602), the CPU 300 transmits, to the CPU 401 via the CPU 321, a notification that a document is placed on the document tray 30.

The CPU 401 receives the notification that a document is placed on the document tray 30. Then, the processing proceeds to step S603. If, on the other hand, a document is not placed on the document tray 30 (NO in step S602), the CPU 321 determines that a document is placed on the document platen glass 202. Then, in step S606, the CPU 321 reads the document placed on the document platen glass 202 and executes a scanning process on the document. After the reading of the document placed on the document platen glass 202 is completed, the CPU 321 transmits to the CPU 401 a notification indicating that the reading of the document is completed.

The CPU 401 receives the notification that the reading of the document placed on the document platen glass 202 is completed. Then, the CPU 401 executes the process described in step S607.

If it is determined that a document is placed on the document tray 30 (YES in step S602), then in step S603, the CPU 401 initializes the value of a scan end flag, which is a flag for indicating whether a series of processes regarding the reading (scanning) of an image on a document normally ends. The value of the scan end flag is stored in the RAM 406. In the present exemplary embodiment, the CPU 401 initializes the scan end flag by setting the scan end flag to "false". If the value of the scan end flag is "true", this indicates that the scanning has normally ended. If, on the other hand, the value of the scan end flag is "false", this indicates that the scanning has not normally ended. For example, if an instruction to stop scanning is received, or if the execution of a copy job is canceled, the CPU 401 determines that the scanning has not normally ended. Then, the CPU 401 overwrites the value of the scan end flag with "false".

Further, in step S603, the CPU 401 sets the value of a counter for managing the number of scanned documents to 1. The counter is stored in the RAM 406 of the controller unit 400.

After the process of step S603 is executed, then in step S604, the image forming apparatus 1000 executes a scanning process. The scanning process executed by the image forming apparatus 1000 in step S604 will be described below with reference to FIG. 10.

After the scanning process is executed, then in step S605, the CPU 401 determines whether the value of the scan end flag is "true".

If the scan end flag is not "true", i.e., the scan end flag is "false", in step S605 (NO in step S605), the CPU 401 executes the process described in step S608.

If the value of the scan end flag is "true" in step S605 (YES in step S605), then in step S607, the CPU 401 reads image data stored in the HDD 409 and executes a printing process on the image data. In step S607, the CPU 401 controls the image forming unit 500 to print an image. At this time, the finisher unit 505 performs binding with a staple at a stapling position set through the "corner settings" screen 1101 or the "double settings" screen 1102.

After the printing process is completed, then in step S608, the CPU 401 deletes the image data stored in the HDD 409. After the process described in step S608 is completed, the CPU 401 ends the processing described in this flowchart.

FIG. 10 is a flowchart illustrating the scanning process described in step S604 in FIG. 9. The processes described in steps S702, S704, S705, S707 to S709, S711 to S715, and S717 in FIG. 10 are achieved by the CPU 401 of the controller unit 400 executing a program stored in the ROM 407. The processes of steps S701, S703, S706, and S716 are achieved by the CPU 300 of the ADF 100 executing a program stored in the ROM 301. The process of step S710 in FIG. 10 is achieved by the CPU 321 of the image reading unit 200 executing a program stored in the ROM 322.

In step S701, the CPU 300 conveys the document placed on the document tray 30 to the CPU 321 of the image reading unit 200.

After the process described in step S701 is executed, then in step S702, the CPU 401 references setting information stored in the RAM 406 and determines whether bound document detection is enabled.

If bound document detection is set to be enabled (YES in step S702), then in step S1200, the CPU 300 of the ADF 100 executes the processing described below with reference to FIG. 11. If bound document detection is set to be disabled (NO in step S702), the processing proceeds to step S706.

In step S703, the CPU 300 determines whether it is detected in step S1200 that the document is bound. The CPU 300 references a document binding flag described below with reference to FIG. 11 and determines whether the conveyed document is a bound document. If it is determined in step S703 that the document is a bound document (YES in step S703), the processing proceeds to step S704. If, on the other hand, it is determined in step S703 that the conveyed document is not a bound document (NO in step S703), the processing proceeds to step S706.

In step S704, the CPU 401 references the counter stored in the RAM 406 and determines whether the document that is currently being conveyed is the first document. In the present exemplary embodiment, after the start of the conveyance of documents, only if the first document is a bound document, the conveyance of the documents is suspended, and then, the user can make stapling settings before the execution of this copy job is started again. The case where it is detected that the second document or a document after that is bound is the following case. The first document is not bound, and the second document and a document after that are bound with a staple. In such a case, the reading of the first document may be completed, and a sheet on which an image on the first document is printed may have already been discharged to outside the image forming apparatus 1000. At this time, if stapling settings are made before the copy job is executed again, only the second document and the document after that will be bound. Thus, there is a possibility that sheets are output in a manner different from that desired by the user who wishes to output sheets on which images are printed that are bound with a staple from the first page. In response, if it is detected that a document is bound when the second document or a document after that is read, the user is not allowed to make stapling settings before the copy job is executed again.

If the document that is bound according to the detection is the first document (YES in step S704), then in step S705, the CPU 401 references the setting information stored in the RAM 406 and determines whether stapling settings are made in output settings.

If stapling settings are not made in step S705 (NO in step S705), then in step S800, the image forming apparatus 1000 executes the processing of a paper jam. The processing of a paper jam in step S800 will be described below with reference to FIG. 8.

After the processing of a paper jam described in step S800 is completed, then in step S707, the CPU 401 displays on the LCD 600 the notification screen 1001 described in FIG. 8. After displaying the notification screen 1001 on the LCD 600 in step S707, then in step S712, the CPU 401 determines whether stapling settings are received on the notification screen 1001. The CPU 401 receives a tap operation on the "stapling settings" 1004 on the notification screen 1001 and displays the "corner settings" screen 1101 or the "double settings" screen 1102 on the LCD 600. According to a tap operation performed on "OK" on the "corner settings" screen 1101 or the "double settings" screen 1102, the CPU 401 determines that stapling settings are received.

If stapling settings are received (YES in step S712), then in step S713, the CPU 401 stores the received stapling settings in the RAM 406. After the CPU 401 stores the stapling settings in the RAM 406, the processing proceeds to step S714. Further, if stapling settings are not received in step S712 (NO in step S712), the processing proceeds to step S714.

In step S714, the CPU 401 determines whether the operation of suspending the copy job is received. In step S714, according to a tap operation performed on the "stop" 1005 on the notification screen 1001 displayed on the LCD 600, the CPU 401 determines that an instruction to stop the copy job is given. If the CPU 401 receives an instruction to stop the copy job in step S714 (YES in step S714), the CPU 401 ends the processing described in FIG. 10.

If the CPU 401 does not receive an instruction to stop the copy job in step S714 (NO in step S714), then in step S715, the CPU 401 determines whether the "start" key 607 is pressed. If the "start" key 607 is not pressed (NO in step S715), the processing returns to step S712. If the "start" key 607 is pressed (YES in step S715), the processing returns to step S701.

If the document that is bound according to the detection is the second document or a document after that in step S704 (NO in step S704), or if it is determined in step S705 that stapling settings are made (YES in step S705), the CPU 401 executes the processing of a paper jam described in step S800. Then, in step S708, the CPU 401 displays the notification screen 1002 on the LCD 600. Then, the CPU 401 executes the processes of steps S714 and S715.

If bound document detection is set to be disabled in step S702 (NO in step S702), or if it is not detected in step S703 that the document is bound (NO in step S703), then in step S706, the CPU 300 of the ADF 100 determines whether a paper jam is detected. For example, if the separation sensor 24 cannot detect the document even after the certain time (t1) elapses from the start of the conveyance, the CPU 321 of the image reading unit 200 determines that a paper jam occurs. Then, the CPU 321 notifies the CPU 401 of the controller unit 400 that a paper jam occurs. The CPU 401 notified of the occurrence of a paper jam by the CPU 321 detects a paper jam in step S706.

If a paper jam is detected in step S706 (YES in step S706), the CPU 401 executes the processing of a paper jam in step S800. Then, after executing the processing of a paper jam, then in step S709, the CPU 401 displays the notification screen 1003 on the LCD 600. The paper jam detected in step S706 is not a paper jam due to the detection of a bound document. Thus, without notifying the user that the document is bound and that stapling settings are to be made, the notification screen 1003 prompts the user to change the document back to the first document and start the reading of the document. Then, the CPU 401 executes the processes described in steps S714 and S715.

If a paper jam is not detected in step S706 (NO in step S706), then in step S710, the CPU 321 of the image reading unit 200 reads an image on the conveyed document. The CPU 321 reads the image on the document, generates image data, and transmits the generated image data to the CPU 401 of the controller unit 400.

Then, in step S711, the CPU 401 receives the image data generated by the CPU 321 of the image reading unit 200 and stores the image data in the HDD 409.

Next, in step S716, the CPU 300 of the ADF 100 determines whether a document is placed on the document tray 30. The CPU 300 acquires the detection result of the document detection sensor 23, thereby determining whether a document is placed on the document tray 30. The CPU 300 of the ADF 100 transmits the detection result of the document detection sensor 23 to the CPU 401 of the controller unit 400. If it is determined that a document is placed on the document tray 30 (YES in step S716), the processing returns to step S701. If it is determined that a document is not placed on the document tray 30 (NO in step S716), this means that the ADF 100 conveys all documents placed on the document tray 30, and images on the documents are read. In response, in step S717, the CPU 401 sets the scan end flag to "true". Then, the CPU 401 ends the processing described in this flowchart.

In the present exemplary embodiment, in step S707 in FIG. 10, the CPU 401 displays the notification screen 1001 on the LCD 600. The notification screen 1001 is a screen for notifying the user that a document of which the conveyance is suspended is a document for which stapling settings are not made. In this manner, the user can know that a binding process setting is not made for this copy job. Further, the notification screen 1001 displays the "stapling settings" 1004. Then, in step S712, the CPU 401 detects that stapling settings are made. In this manner, if it is detected that a bound document is conveyed during the execution of a copy job for which stapling settings are not made, the user can make a binding process setting for the document.

Next, with reference to FIG. 11, a description is given of the processing executed by the CPU 300 of the ADF 100 in step S1200 in FIG. 10. The processing described in this flowchart is achieved by the CPU 300 of the ADF 100 executing a program stored in the ROM 301.

In step S1201, the CPU 300 sets a document binding flag stored in the RAM 302 to off, thereby initializing the document binding flag.

In step S1202, the CPU 300 conveys the document placed on the document tray 30 by a predetermined distance. It is desirable that the predetermined distance should be a distance that, even in a case where a bound document is conveyed, would not cause tearing of the document. In the present exemplary embodiment, the predetermined distance is, for example, an approximate distance at which the front end of a document of which the conveyance is started can reach the separation pad 21. In the present exemplary embodiment, in step S1201, the CPU 300 conveys the document by the predetermined distance. Alternatively, in step S1201, the CPU 300 may convey the document for a predetermined time.

In step S1203, using the distance measurement sensor 22, the CPU 300 measures a distance (p1) from the distance measurement sensor 22 to the document. Then, in step S1204, the CPU 300 determines whether the distance (p1) measured by the distance measurement sensor 22 is greater than a predetermined threshold. The predetermined threshold is, in a case where the ADF 100 conveys a document bound with a staple, the distance between the distance measurement sensor 22 and the document when the shape of the document is distorted and a part of the document turns up. As a matter of course, the predetermined threshold may be a distance somewhat longer than the distance between the distance measurement sensor 22 and the document when a part of the document turns up.

If the distance measured by the distance measurement sensor 22 is longer than the predetermined threshold in step S1204 (NO in step S1204), the CPU 300 of the ADF 100 ends the processing described in FIG. 11.

If the distance measured by the distance measurement sensor 22 is less than or equal to the predetermined threshold in step S1204 (YES in step S1204), then in step S1205, the CPU 300 sets the document binding flag stored in the RAM 302 to on. Then, the image forming apparatus 1000 ends the processing described in this flowchart.

Next, with reference to FIG. 12, a description is given of the processing of a paper jam executed in step S800. Steps S801 and S803 in a flowchart described in FIG. 12 are achieved by the CPU 300 reading and executing a program stored in the ROM 301. The process described in step S802 in FIG. 8 is achieved by the CPU 401 reading and executing a program stored in the ROM 407.

In step S801, the CPU 300 suspends the conveyance of the document according to an instruction from the CPU 401. Then, the CPU 321 notifies the CPU 401 that the conveyance of the document is suspended.

In step S802, the CPU 401 receives from the CPU 321 the notification indicating that the conveyance of the document is suspended. Then, the CPU 401 displays on the LCD 600 the screen 907 illustrated in FIG. 7.

In step S803, the CPU 300 acquires the values of the various sensors 304 and determines whether a paper jam has occurred. If it is determined that a paper jam has been removed (YES in step S803), the CPU 401 hides the screen 907 displayed on the LCD 600 and ends the processing described in this flowchart. If it is determined that a paper jam has not been removed (NO in step S803), the CPU 401 repeatedly performs the process described in step S803.

As described above, in the present exemplary embodiment, if the ADF 100 conveys a bound document, it is determined whether a setting for binding sheets to be output is made for a copy job to be executed by the image forming apparatus 1000. Then, if a binding process setting for binding output documents is not made for the copy job to be executed, a notification screen for notifying the user that the conveyed document is a bound document is displayed. Further, if a binding process setting is not made for the copy job, the LCD 600 displays a screen for notifying the user that a binding process setting is not made. In this manner, the user who copies a bound document can be notified that a binding process setting is not made.

Further, it is possible to make a binding process setting on the screen for giving a notification that a binding process setting is not made for the copy job. In this manner, the user can make a binding process setting for binding, with a staple, sheets on which images are formed without stopping the copy job.

Further, in the present exemplary embodiment, if a document detected to be bound by the ADF 100 is the second document or a document after that read by the ADF 100, the conveyance of the document is suspended, and a screen for prompting the user to change the document back to the initial state and start the reading of the document is displayed. At this time, the screen does not give a notification that a binding process setting is not made. Further, the screen does not receive a binding process setting, either. In this manner, a sheet on which an image obtained by reading a document that is not bound is printed among documents placed in the ADF 100, and a sheet on which an image obtained by reading a bound document is printed among the documents placed in the ADF 100 can be prevented from being bound with a staple.

Other Exemplary Embodiments

In the present exemplary embodiment, during the execution of a job for which a binding process setting is not made, it is detected that a conveyed document is a bound document, and the notification screen 1001 is displayed on the LCD 600. Then, if the user performs a tap operation on the "stapling settings" 1004 on the notification screen 1001, the "corner settings" screen 1101 or the "double settings" screen 1102 is displayed on the LCD 600. Alternatively, the method for binding sheets and a binding position may be able to be set on the notification screen 1001. For example, a "corner" button and a "double" button may be displayed on the notification screen 1001, and according to either of the buttons selected by the user, a button for selecting a position to be bound may be displayed on the notification screen 1001. In this manner, the user can make a binding process setting without causing the notification screen 1001 to transition to another screen.

Further, the notification screen 1001 may be displayed on the LCD 600, and audio guidance for notifying the user of a method for making a binding process setting may be provided. For example, the image forming apparatus 1000 may display the notification screen 1001 on the LCD 600, and an audio message such as 'Please press the "0" key of the numeric keypad 601 if you make stapling settings' may be provided. Further, it may be detected that the "0" key of the numeric keypad 601 is pressed. Then, also when the type of binding is set, similarly, an audio message such as 'Please press the "1" key if you bind sheets at a single position, or the "2" key if you bind sheets at two positions' may be provided, whereby stapling settings may be made.

Further, in the present exemplary embodiment, the notification screen 1001 may notify the user that a binding process setting is not made for a copy job. Then, the notification screen 1001 may display a message for urging the user to make a binding process setting. For example, the notification screen 1001 may display a message "Stapling settings are not made. If you make stapling settings, please press the stop button and make stapling settings through the copy screen."

In the present exemplary embodiment, using a distance measurement sensor, the distance from the distance measurement sensor to the top surface of a document is calculated. Then, based on whether the calculated distance is shorter than a threshold, it is determined whether the document conveyed by an ADF is a bound document. The method for determining whether the document conveyed by the ADF is a bound document is not limited to the above method. For example, the distance measurement sensor may measure the distance from the distance measurement sensor to the top surface of the document at certain time intervals after the start of the conveyance of the document. Using the amount of change from the distance measured most recently by the distance measurement sensor, if the amount of change in the distance measured by the distance measurement sensor is equal to or greater than a predetermined value, this indicates that the shape of the document that is being conveyed is distorted, and it may be determined that the document that is being conveyed is a bound document.

Further, within the ADF, two sensors for detecting the presence or absence of a sheet are provided in a direction vertical to the direction in which a sheet is conveyed. Then, after the start of the conveyance of a document, if only either one of the two sensors detects the document, it may be determined that the document that is being conveyed is a bound document. The binding portion of a document bound with a staple or a clip is thicker than a single document. Thus, it is possible that the conveyance of the document will be delayed between the separation roller 2 and the separation pad 21. A portion opposite to the binding portion of the document is conveyed earlier. Thus, if only either one of the two sensors provided within the ADF detects a sheet, it is possible to detect that a document that is being conveyed is a bound document. In the above description, the number of sensors is two. However, a plurality of sensors more than two may only need to be provided. At this time, if any one of the plurality of sensors detects a sheet, and any other one of the plurality of sensors does not detect the sheet, the image forming apparatus determines that the sheet is bound.

Further, a sensor for detecting metal may be provided within the ADF. Then, using the sensor, it may be detected that a document that is being conveyed is bound. To bind a document, a staple or a clip made of metal is often used. In response, at the position of the distance measurement sensor 22, a sensor for detecting metal is provided instead of the distance measurement sensor 22. In this manner, it is possible to detect a document bound with a staple or a clip.

The present disclosure can be achieved also by performing the following process. This is the process of supplying software (a program) for achieving the functions of the above exemplary embodiment to a system or an apparatus via a network or various recording media, and of causing a computer (or a CPU or a microprocessor unit (MPU)) of the system or the apparatus to read and execute a program.

Further, control circuits designed to execute the processing based on the flowcharts may be used instead of the CPUs 300, 321, and 401.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors and one or more memories (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2017-167286, filed Aug. 31, 2017, which is hereby incorporated by reference herein in its entirety.

What is claimed is:

1. An image forming apparatus comprising:
   a conveyer that conveys a document placed on a document tray;
   a reader that reads an image on the document conveyed by the conveyer;
   a printer that prints on a sheet the image read by the reader;
   a binder that binds the sheet on which the image is printed by the printer;
   a controller that suspends conveyance of the document by the conveyer according to detection that the document conveyed by the conveyer is a bound document; and
   a display that displays a screen for prompting a user to start reading of the document of which the conveyance is suspended by the controller,
   wherein the screen is a screen capable of receiving a setting of a binding process for binding the sheet by the binder.

2. The image forming apparatus according to claim 1, wherein the display displays the screen during execution of a job for which the setting of the binding process by the binder is not set.

3. The image forming apparatus according to claim 1, wherein the controller determines whether a copy job that is being executed is a job for which the setting of the binding process for binding the sheet by the binder is set.

4. The image forming apparatus according to claim 1, wherein it is detected, based on a distance from the detection unit to an upper surface of the document, that the document conveyed by the conveying unit is a bound document.

5. The image forming apparatus according to claim 4, further comprising a distance measuring sensor that measures the distance from the distance measuring sensor to the upper surface of the document, and in a case where the measured distance is less than a predetermined distance, detects that the document conveyed by the conveyer unit is a bound document.

6. The image forming apparatus according to claim 1, wherein in a case where the controller performs the detection during conveyance of a second document to be read by the reader, the display displays the screen that does not receive the setting of the binding process.

7. The image forming apparatus according to claim 1, wherein in a case where the controller performs the detection during conveyance of a second document to be read by the reader, the display displays the screen that does not receive the setting of the binding process.

8. The image forming apparatus according to claim 1, further comprising a user interface that receives a setting regarding whether the controller is to perform the detection.

9. The image forming apparatus according to claim 1,
   wherein in a case of a jam of the document, the display displays a screen for prompting the user to remove the document from the image forming apparatus, and
   wherein in a case of the document having been removed from the image forming apparatus, the display displays the screen for prompting the user to start the reading of the document.

10. The image forming apparatus according to claim 1, wherein the screen for receiving the setting of the binding process by the binder is a screen for receiving, from the user, selection of a method for binding the sheet by the binder or a binding position of the sheet.

11. The image forming apparatus according to claim 1, wherein in a case where the controller performs the detection during execution of a copy job for which the setting of the binding process for binding the sheet by the binder is not set, the display displays a screen capable of receiving an instruction to stop the copy job.

12. The image forming apparatus according to claim 1, wherein the controller detects that the conveyed document is a bound document by detecting metal conveyed by the conveyer.

13. The image forming apparatus according to claim 1, further comprising a plurality of document detection sensors configured to acquire information indicating presence or absence of the document,
   wherein using the information indicating the presence or absence of the document acquired by the plurality of document detection sensors, the controller detects that the document is a bound document.

14. The image forming apparatus according to claim 1, wherein the display displays a message for notifying the user, audibly, of a method for setting the binding process to be executed by the binder.

15. The image forming apparatus according to claim 1, wherein the distance measuring sensor, measures a distance from the distance measuring sensor to the document at predetermined time intervals, and detects that the document is a bound document using an amount of change in the measured distance.

16. A control method for controlling an image forming apparatus, the control method comprising:
   conveying, by a conveyer, a document placed on a document tray;
   reading, by a reader, an image on the conveyed document;
   printing, by a printer, the read image on a sheet;
   binding, by a binder, the sheet on which the image is printed;
   suspending, according to detection that the conveyed document is a bound document, conveyance of the document; and
   displaying, by a display, a screen for prompting a user to start reading of the document of which the conveyance is suspended,
   wherein the screen is a screen capable of receiving a setting of a binding process to be executed.

17. An image forming apparatus comprising:
   a conveyer that conveys a document placed on a document tray;

a reader that reads an image on the document conveyed by the conveyer;

a printer that prints on a sheet the image read by the reader;

a binder that binds the sheet on which the image is printed by the printer;

a controller that suspends;

conveyance of the document that is bound according to detection that the document conveyed by the conveying unit is a bound document; and a display that displays a screen for prompting a user to start reading of the document of which the conveyance is suspended by the controller, wherein the screen is a screen for giving a notification that a setting of a binding process to be executed by the binder is not set for a job that is being executed.

18. The image forming apparatus according to claim 17, wherein the screen is a screen capable of receiving an operation of causing the screen to transition to a screen for setting the job that is being executed.

19. A control method for controlling an image forming apparatus, the control method comprising:

conveying, by a conveyer, a document placed on a document tray;

reading, by a reader, an image on the conveyed document;

printing, by a printer, on a sheet the read image;

binding, by a binder, the sheet on which the image is printed;

suspending, by a controller, conveyance of the document that is bound according to detection that the conveyed document is a bound document; and displaying, by a display, a screen for prompting a user to start reading of the document of which the conveyance is suspended, wherein the screen is a screen for giving a notification that a setting of a binding process to be executed is not set.

* * * * *